(12) United States Patent
Corocher et al.

(10) Patent No.: US 6,506,045 B2
(45) Date of Patent: Jan. 14, 2003

(54) INJECTION NOZZLE FOR PLASTIC SUBSTANCES

(75) Inventors: Carlo Corocher, Treviso (IT); Bruce Fishman, Manchester by the Sea, MA (US); Steve J. Peck, Billerica, MA (US); Matteo Zoppas, Pordenone (IT)

(73) Assignee: SIPA S.p.A., Treviso (IT)

( * ) Notice: Subject to any disclaimer, the term of this patent is extended or adjusted under 35 U.S.C. 154(b) by 45 days.

(21) Appl. No.: 09/837,331

(22) Filed: Apr. 19, 2001

(65) Prior Publication Data

US 2002/0127297 A1 Sep. 12, 2002

(30) Foreign Application Priority Data

Apr. 20, 2000 (IT) ................................. PN2000A000025

(51) Int. Cl.[7] ................................................ B29C 45/20
(52) U.S. Cl. ........................................ 425/549; 425/568
(58) Field of Search ................................ 425/549, 562, 425/563, 564, 565, 566, 568

(56) References Cited

U.S. PATENT DOCUMENTS 6,146,126 A * 11/2000 Braun ......................... 425/549
6,309,207 B1 * 10/2001 Kalemba ..................... 425/549

* cited by examiner

*Primary Examiner*—Tim Heitbrink
(74) *Attorney, Agent, or Firm*—Wenderoth, Lind & Ponack, L.L.P.

(57) ABSTRACT

A nozzle, for the injection of molten plastics, includes a rear central portion terminating with a planar surface, and an outer annular element terminating with a corresponding planar surface on its rear side. The terminal planar surface of the central portion is situated in a more rearward position relative to the planar surface of the outer annular element. A first annular groove forms an acute angle between the outer edge of the rear portion and an inner surface of the outer annular element. A second annular groove, forming an acute angle, is provided in the rear portion. The two annular grooves open in opposite directions, and the bottoms of the respective grooves are located at substantially the same height of the nozzle.

15 Claims, 6 Drawing Sheets

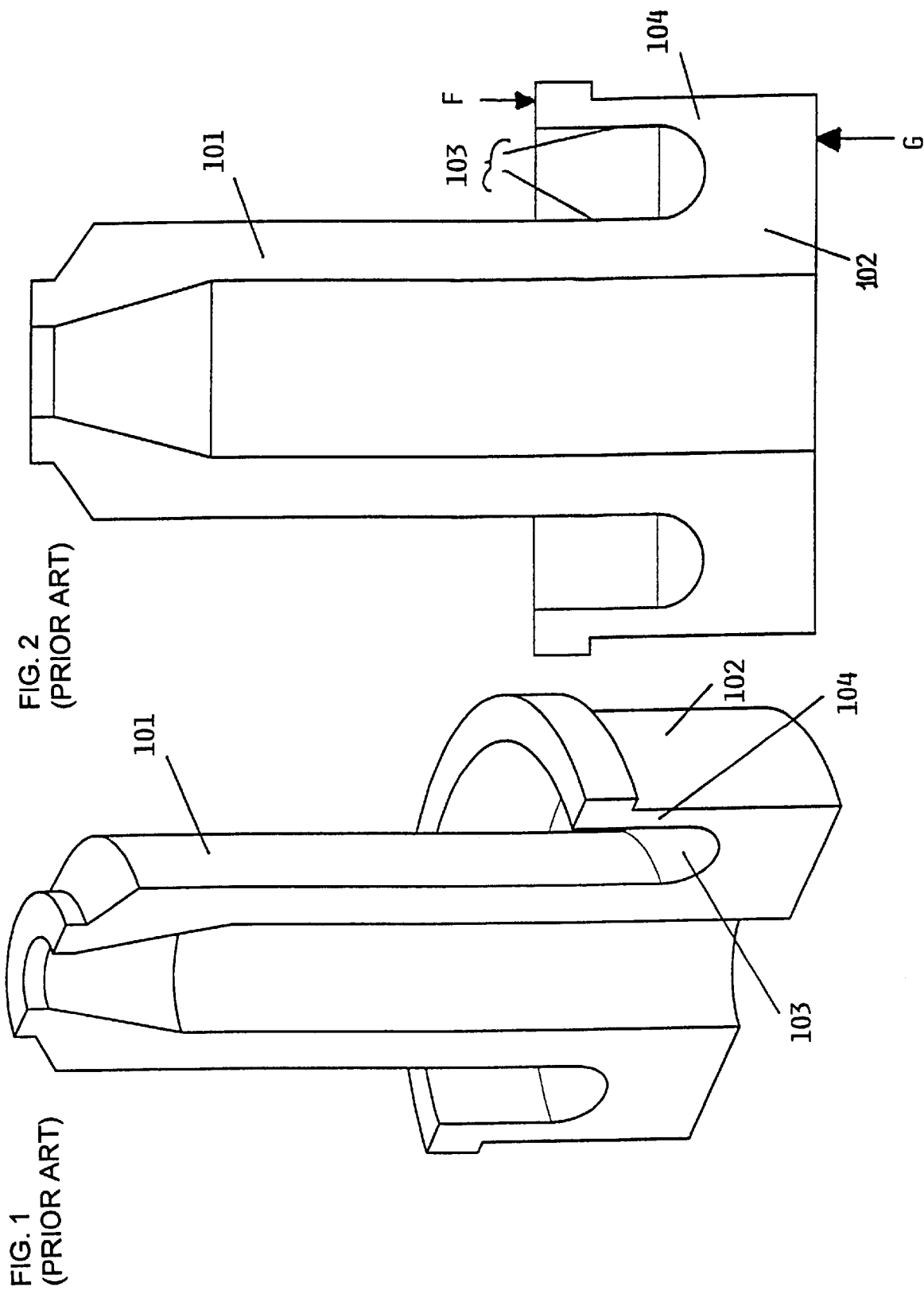

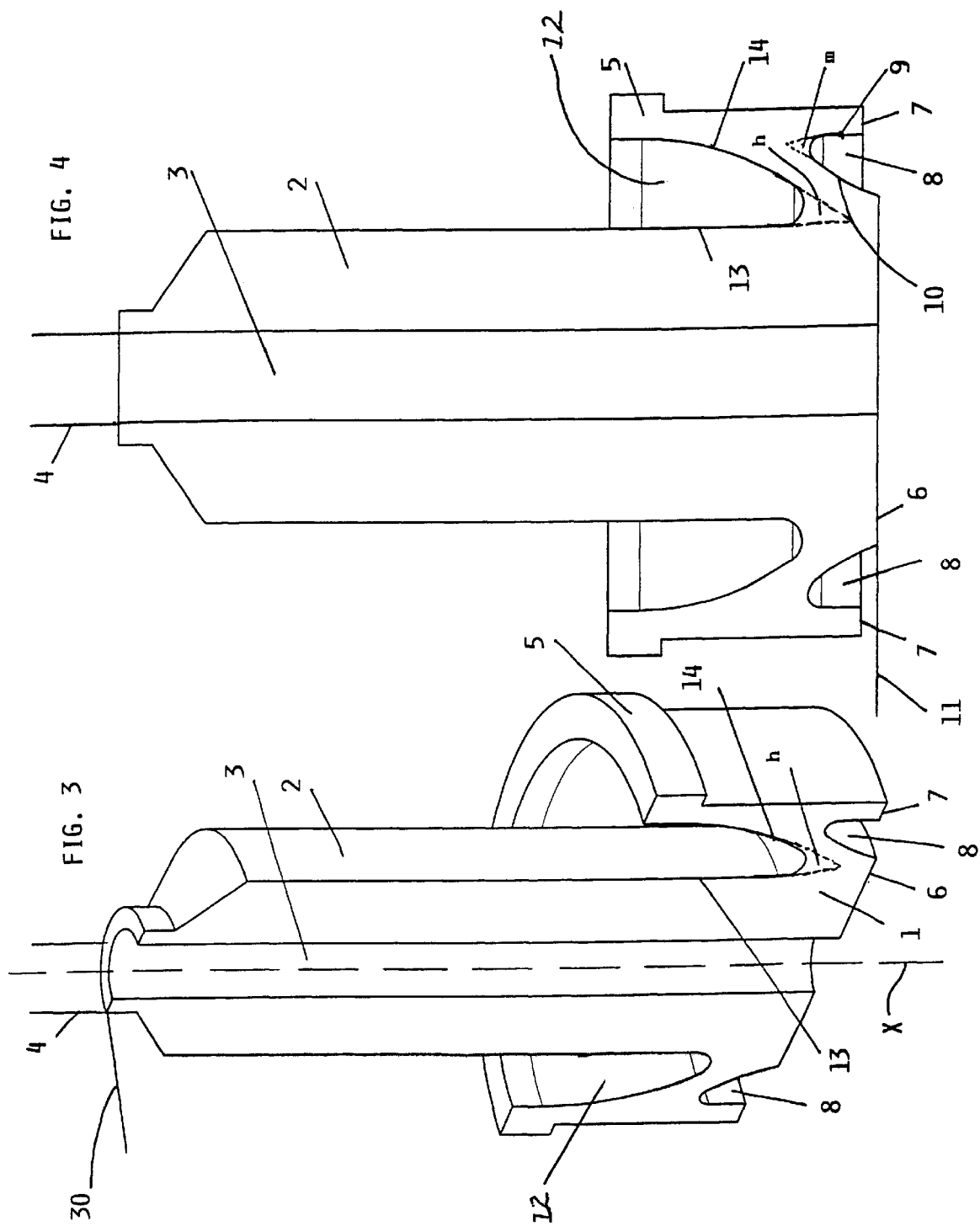

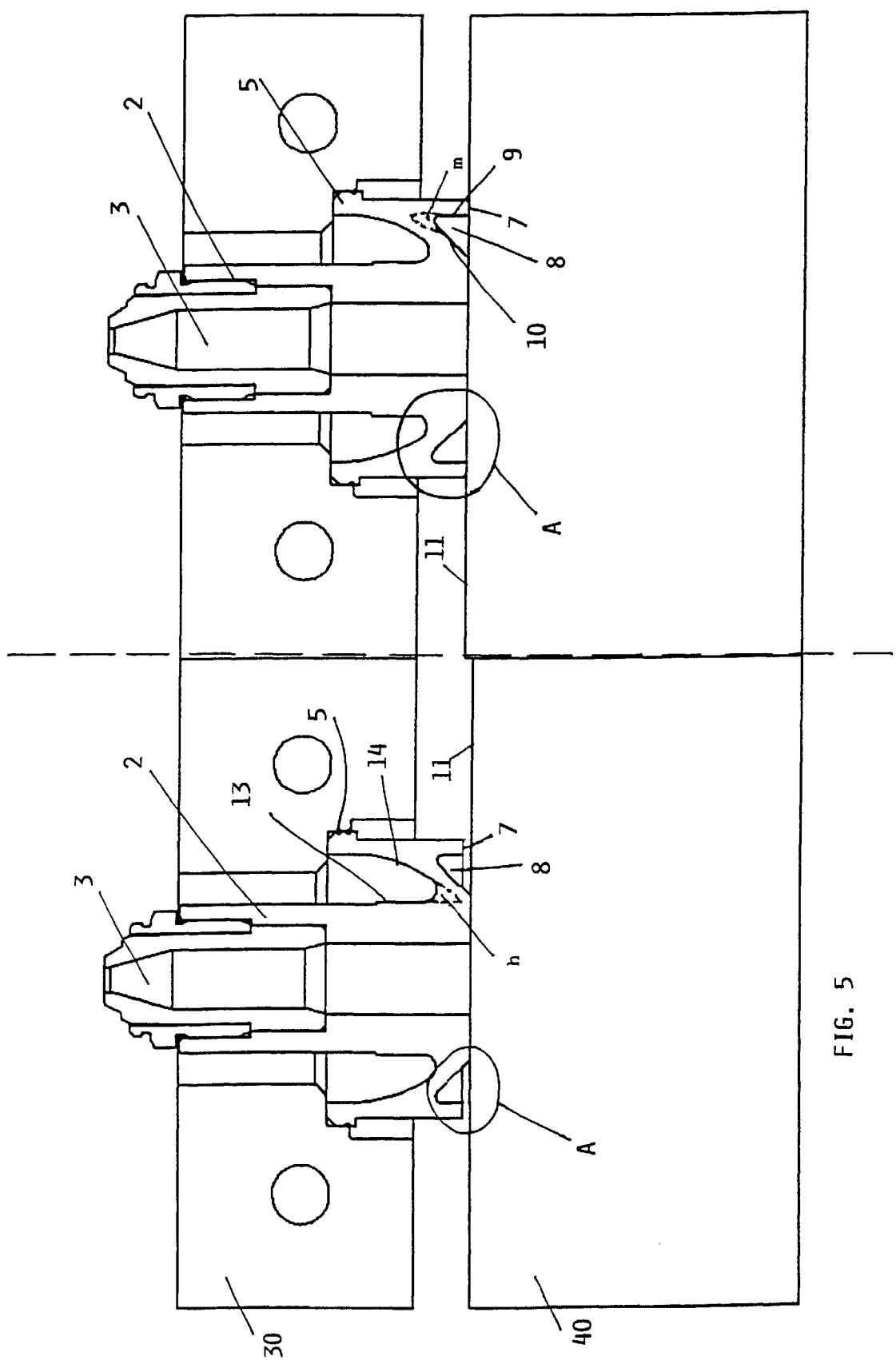

INJECTION NOZZLE FOR PLASTIC SUBSTANCES

BACKGROUND OF THE INVENTION

The present invention is directed to a particular type of nozzle for the injection of a molten plastic substance into one or several molding cavities.

The present invention is applicable preferably to nozzles used in machines adapted for molding, at the same time, a plurality of plastic articles, i.e. the so-called "preforms", that are intended for subsequent processing by blow molding into appropriate final containers, especially plastic bottles.

Although reference will be made in the following description, mainly for reasons of greater descriptive convenience, to a vertical-drive machine for molding preforms of plastic material, as this is used in combination with the preliminary steps of melting and extrusion of the plastic material, it will be appreciated that the present invention shall be understood as applying also to horizontal-drive molding machines or even to other uses, as far as these fall within the scope of the appended claims.

It is generally known in the art that, during a preform molding operation, use is generally made of a molding machine comprising a nozzle-carrying plate and a plate provided therebelow for the so-called hot chambers (or hot runners, as they are more particularly known in the art). This plate generally contains the hot runners, i.e. the conduits provided to transfer the molten resin from an appropriate extruder. The cavity-carrying plate contains a plurality of cavities into which the flow of plastic resin flowing in from the base plate is injected. The flow of plastic resin is transported between the elements by appropriate respective injection nozzles arranged between the cavity-carrying plate and the nozzle-carrying plate.

The means that are commonly used to hold the nozzles in close contact with the surfaces of the plates include providing the nozzles with threads in view of then fastening them by screwing in, or, as an alternative thereto, generating a force between the parallel surfaces of the nozzles and the surfaces of the plates, in such a manner as to enable the nozzles to be locked in position therebetween by pressure.

All such measures are well-known to those skilled in the art and are briefly discussed herein for the sole purpose of more effectively introducing the technical context which the present invention is referring to.

One of the most significant problems concerning the design and the utilization of such nozzles arises from the circumstance that these nozzles are assembled under cold conditions and must start operating with the other parts of the machine while not yet at their rated working or steady-state temperature, without giving rise to losses of molten resin, not even in the initial phases of the process, when the installation has not yet reached its steady-state working conditions.

During operation, the plates that are coupled with the nozzles heat up and, as a result, tend to expand, thereby reducing the available space for the nozzle and, therefore, a compression force may develop and damage the mutually involved parts.

In view of reducing such a compression effect, the need arises for an initial coupling that is not overly tight. This, however, might well lead to initial losses of resin, i.e. a situation that should on the contrary be prevented in any case, due to the need for such leaking resin to be immediately removed, in order to avoid serious losses caused by machine downtime and the necessary personnel for performing such a task.

Nozzles for the injection of plastic substances of the kind illustrated in FIGS. 1 and 2 are known to have been disclosed and to be normally used in the art. Such nozzles include a front central portion 101 and a rear annular portion 102. A groove 103 is provided in the rear annular portion 102 so as to delimit an external wall 104.

When the nozzle is normally coupled between the nozzle-carrying plate 30 and the plate 40 containing the hot runners, the nozzle is subjected to mutually opposing forces indicated by the letters "F" and "G" in the Figures.

Due to the structure of the nozzle, the latter withstands the mutually contrasting action of these forces through the compression of the wall 104 and the rear solid portion of rear annular portion 102.

Since the latter is solid, it inherently has a very high compressive strength and, therefore, a practically nonexistent ability to deform axially. As far as the wall 104 is concerned, it has a rather small axial dimension and, as a consequence, a correspondingly small compressibility, even if subjected to an elevated compression. In practice, therefore, such nozzles eventually offer a reduced ability to deform elastically and, as a result, a reduced ability to take up the dimensional deviations that are introduced between the plates by the thermal expansion processes thereof.

The state of the art concerning nozzles that are pressure fitted and locked between plates is disclosed in the following patent publications: U.S. Pat. No. 4,588,367; U.S. Pat. No. 5,220,154; U.S. Pat. No. 5,554,395; U.S. Pat. No. 5,759,595; and U.S. Pat. No. 5,820,899.

All of these patent publications address, according to a variety of approaches, the issue of finding the best possible solution to the problem of coping with a number of mutually clashing requirements, i.e.:

ensuring protection when starting from a cold condition the wide range of dimensional tolerances of both plates and nozzles; and the capability of operating within a wider temperature range than the range normally involved or used, including the possibility of reaching temperatures of up to 50° C. above the normal operating temperature.

However, none of the cited patents appears to be able to solve all of the above mentioned requirements to a satisfactory extent. Furthermore, some of them even call for the use of supplementary sealing means, such as gaskets and the like, which do not solve the problem in any permanent manner, but rather tend to introduce further complications.

SUMMARY OF THE INVENTION

Based on the above considerations, it is therefore a main purpose of the present invention to provide a nozzle that enables all of the above three mentioned mutually clashing requirements to be complied with automatically.

A further purpose of the present invention is to provide a nozzle of the above cited type, which is capable of being easily implemented, used and operated through the use of readily available and, therefore, cost-effective materials and techniques.

Such objects of the present invention, along with further features thereof, are achieved with a nozzle that is constructed and operates as recited in the appended claims.

The present invention may take the form of a preferred, although not sole embodiment such as the one that is described in detail below by way of a non-limiting example with reference to the accompanying drawings, in which:

BRIEF DESCRIPTION OF THE DRAWINGS

FIG. 1 is a perspective view of a median section through a prior art nozzle;

FIG. 2 is a front view of the nozzle illustrated in FIG. 1;

FIG. 3 is a perspective view of a median section through a nozzle according to the present invention;

FIG. 4 is a front view of the section of the nozzle illustrated in FIG. 3;

FIG. 5 is a vertical median-sectional view of an embodiment of the present invention shown in two distinct working phases thereof;

DETAILED DESCRIPTION OF THE INVENTION

Figure 6:
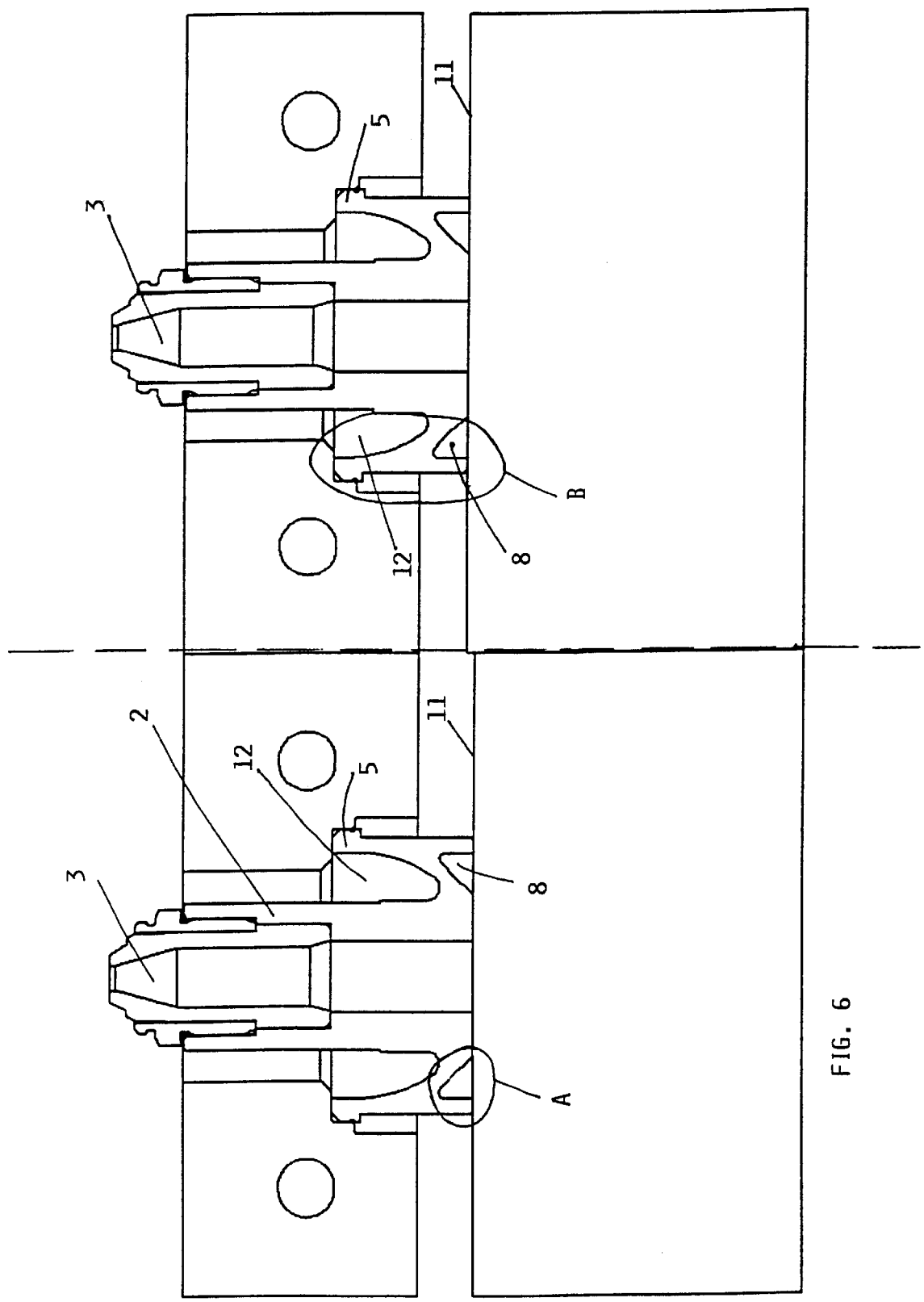
FIG. 6 is a vertical median-section view of the embodiment of the present invention shown in FIG. 5 in two other distinct working phases thereof, a phase of which is common to a phase illustrated in FIG. 5.
Figure 7:
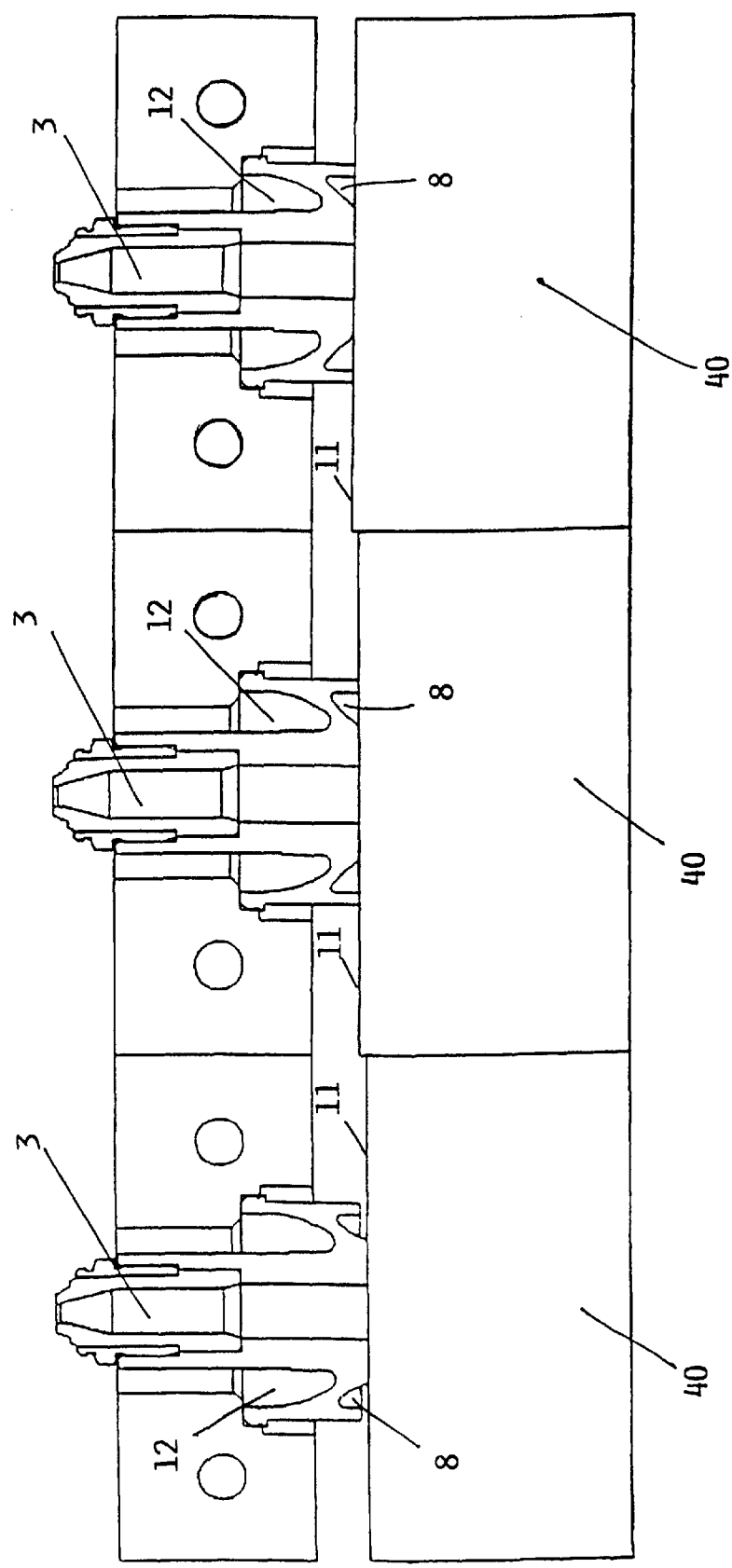
FIG. 7 is a vertical median-sectional view of the above mentioned embodiment of the present invention, in which all of the three working phases shown in the preceding Figures are represented.

With reference to the above described Figures, a nozzle according to the present invention comprises a rear portion 1, a front portion 2 and an inner channel 3 extending through both of the front and rear portions. The nozzle is adapted to typically carry the flow of molten plastic resin towards one or more injection nozzles 4 arranged on a nozzle-carrying plate 30.

The vertical median section of such a nozzle shows a configuration that is substantially symmetrical with respect to a vertical axis X passing through the center of the inner channel.

The front portion 2 is substantially elongated, while the rear portion 1 is provided with an outer annular element 5, which has an outer profile that is substantially a cylindrical one that surrounds both the front portion and the inner channel 3.

The outer annular element 5 terminates on its rear side with a terminal planar surface 7 and, the rear portion 1 terminates with a respective planar surface 6 that, in contrast to the afore described prior art, is situated in a more backward or rearward position with respect to the terminal planar surface 6 of the annular element.

With reference to the two sectional views illustrated in FIGS. 3 and 4, between the annular element 5 and the outer surface of the front portion there is provided an annular groove 12 which, according to a feature of the present invention, is formed at an acute angle h, in which the inner side 13 is substantially parallel to the axis X of the nozzle, and the outer side 14 is inclined with respect to the same axis, such that the groove 12 is open towards the front end portion of the nozzle.

According to the present invention, a second annular groove 8 is provided between the terminal planar surface 7 of the annular element 5 and the planar surface 6. The second annular groove is substantially coaxial with the axis X of the nozzle.

In a preferred manner, the second groove 8 is formed in such a manner as to ensure that the median axial section thereof is shaped so as to form an acute angle m, in which the outer side 9 is substantially parallel to the axis X of the nozzle, and the inner side 10 is inclined with respect to the same axis. The second groove 8 opens towards the rear end portion of the nozzle.

In normal use, this nozzle is press-fitted and locked between the nozzle-carrying plate 30 and a surface 11 that is delimited on top of the hot-runner plate 40.

As can be seen from a mutual comparison of the two sectional views illustrated in FIG. 5, after the resting surface 11 is raised, the configuration of the nozzle allows for the circled portion, generally indicated at A, of the outer annular element to deflect so as to enable the terminal planar surfaces 6 and 7 to become level on the same plane of common resting surface 11.

Further, due to the raising of the surface, which is a result of the thermal expansion that occurs during operation, it follows that such expansion does not originate any problem and, in particular, it does not impair the tightness of the nozzle to any extent, since in the initial assembly, and therefore under cold start conditions, such a sealing effect can be ensured by the nozzle being appropriately tightened against the resting surface 11. Whereas, under normal, i.e. steady-state operating conditions, the thermal expansion thereof is automatically taken up by the deformation of the circled portion generally indicated at A, as namely allowed for by the provision of the groove 8 and preferably by the particular form used and described above.

Furthermore, as this can be noticed by comparing with each other the two sectional views illustrated in FIG. 6, as a consequence of a further increase in the temperature of the two plates beyond the normal steady-state value, and therefore of a corresponding further raising of the common resting surface 11 bringing about a greater compressive force, such a configuration allows for the circled portion, generally indicated at B, of the outer annular element to appropriately deflect, so as to ensure that the nozzle is held firmly in position and retains its tight seal against leakage of molten resin, without in anyway inducing excessive strains on the other component parts involved.

Figure 8:
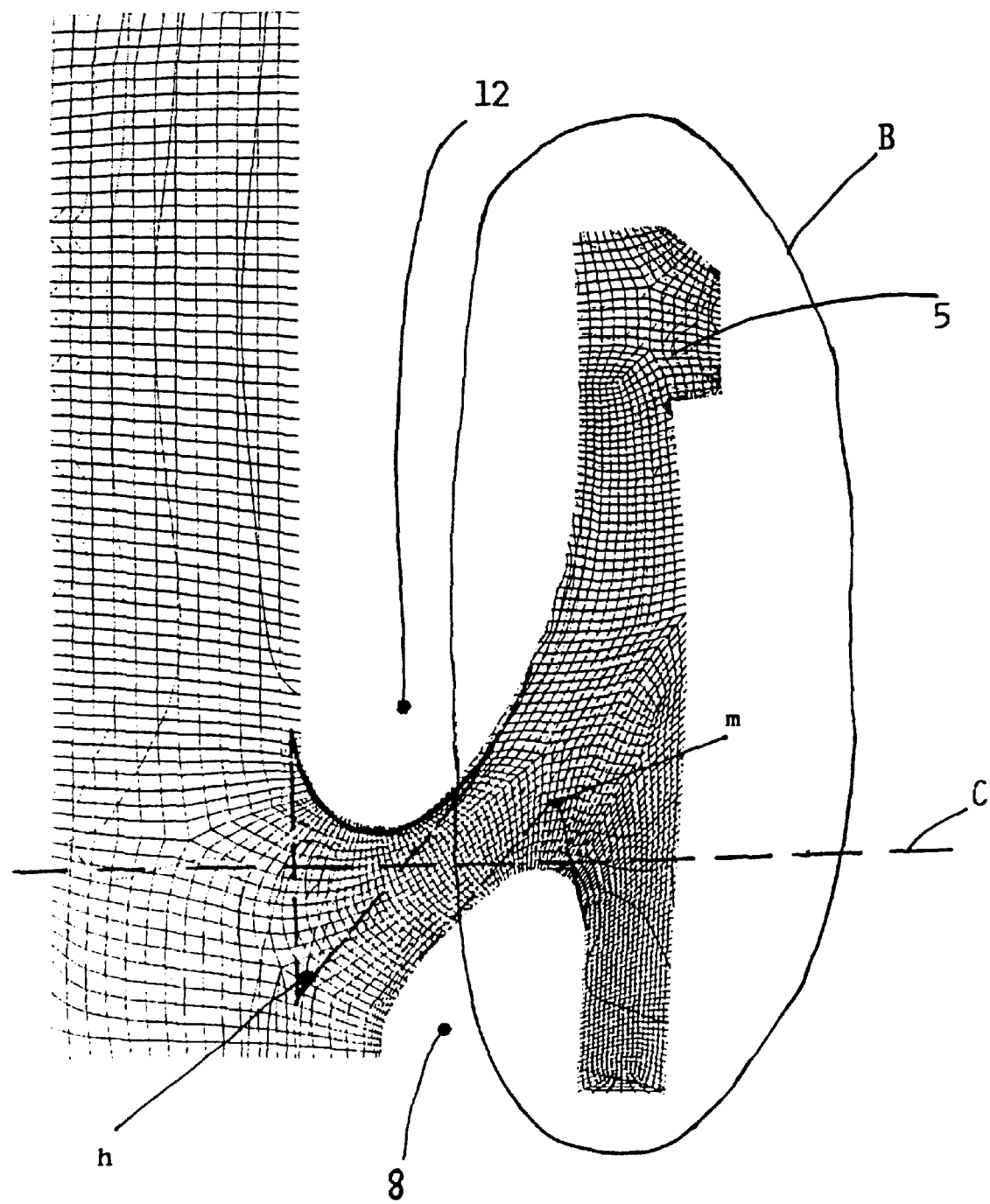
FIG. 8 is a view showing the annular portion when subjected to a particular deformation strain under extreme stress conditions.

In fact, FIG. 8 clearly illustrates the modes of preferential deflection of the zone or portion B under the worst overtemperature conditions, whereas such a deflection would not be accommodated or allowed for by the prior-art nozzles.

The described solution according to the present invention furthermore offers the possibility of a number of advantages. In particular, it has in fact been found experimentally that a maximum result in terms of ability to deform under elevated stress loads is obtained if the acute angles h, m of the first annular groove and the second annular groove, respectively, are substantially arranged at the same level C with respect to the axis of the nozzle, in such a manner as to provide a sufficiently thin and, therefore, elastic wall between the two grooves. Also, it has been further determined experimentally that an optimum compromise between elasticity and the greatest possible deformation, which is a function of the highest acceptable overtemperature, is achieved if the depth of the second groove 12 is at least twice the depth of the first groove 8.

Finally, an advantageous configuration of the nozzle has also been obtained by situating the acute angle h of the groove 12 within the acute angle m of the second groove 8. In other words, as shown in FIG. 8, the groove 12 is located closer to the central axis X of the nozzle than the groove 8.

What is claimed is:

1. A nozzle for injecting molten plastic substance into a mold, said nozzle comprising:

a rear portion;

a front portion; and a melting channel extending between said rear portion and said front portion of said nozzle for conveying the molten plastic substance in a forward direction, said front portion having an elongated shape and said rear portion including an outer annular element that surrounds an inner portion of said rear portion adjacent to said melting channel, wherein:

said outer annular element has a substantially cylindrical shape, a forward facing surface, and a rearward facing planar surface;

a first annular groove is defined between an inner peripheral surface of said annular element and an outer peripheral surface of said front portion;

said rear portion terminates, in a central zone thereof, with a planar surface;

the rearward facing planar surface of said rear portion is situated in a more rearward position than the planar terminal surface of said outer annular element; and a second annular groove is located in said rear portion between the planar surface of said outer annular element and the planar surface of the central zone of the rear portion.

2. The nozzle as claimed in claim 1, wherein the median axial section of said second annular groove is in the shape of an acute angle, and an outer side of the angle is substantially parallel to a central axis of the melting channel, and an inner side of the angle is inclined with respect to the central axis so that the second annular groove opens in a rearward direction of said nozzle.

3. The nozzle as claimed in to claim 2, wherein the median axial section of said first annular groove is in the shape of an acute angle, and an inner side of the angle is substantially parallel to a central axis of said nozzle, and an outer side of the nozzle is inclined with respect to the central axis so that the first annular groove opens towards the front end portion of said nozzle.

4. The nozzle as claimed in claim 1, wherein the median axial section of said second annular groove is in the shape of a first acute angle, and an outer side of the first acute angle is substantially parallel to a central axis of the melting channel, and an inner side of the first acute angle is inclined with respect to the central axis so that the second annular groove opens in a rearward direction of said nozzle, wherein the median axial section of said first annular groove is in the shape of a second acute angle, and an inner side of the second acute angle is substantially parallel to a central axis of said nozzle, and an outer side of the nozzle is inclined with respect to the central axis so that the first annular groove opens towards the frontward direction of said nozzle, wherein the first and second acute angles of said first annular groove and said second annular groove are provided on substantially the same level with respect to the central axis of said nozzle.

5. The nozzle as claimed in claim 4, wherein the depth of said first groove is at least twice the depth of said second groove.

6. The nozzle as claimed in claim 3, wherein the depth of said first groove is at least twice the depth of said second groove.

7. The nozzle as claimed in claim 3, wherein a radially outermost surface of said first groove is arranged radially inward of a radially outermost surface of said second groove.

8. The nozzle as claimed in claim 4, wherein said acute angle of said first groove is arranged within said acute angle of said groove.

9. The nozzle as claimed in claim 5, wherein said acute angle of said first groove is arranged within said acute angle of said groove.

10. A nozzle for injecting molten plastic substance into a mold, said nozzle comprising:

an elongated inner portion having a rear side, a front discharge side, and an inner flow passage extending between the rear side and the front discharge side;

an outer annular element connected to a rear portion of said elongated inner portion;

a first annular groove formed between an outer peripheral surface of said elongated inner portion and inner peripheral surface of said outer annular element, said first annular groove opening toward the front discharge side of said elongated inner portion; and a second annular groove formed between a rearwardly facing planar surface of said outer annular element and a rearwardly facing planar surface of said elongated inner portion, said second annular groove opening in a rear direction of said elongated inner portion, wherein a portion of said second annular groove is positioned radially outwardly with respect to said first annular groove.

11. The nozzle as claimed in claim 10, wherein the rearwardly facing planar surface of said elongated inner portion is positioned rearwardly in an axial direction with respect to the rearwardly facing planar surface of said outer annular element.

12. The nozzle as claimed in claim 10, wherein an inner wall of said first annular groove is substantially parallel with respect to a central axis of the inner flow passage, and an outer wall of said first annual groove is inclined away from the inner flow passage.

13. The nozzle as claimed in claim 10, wherein an outer wall of said second annular groove is substantially parallel with respect to a central axis of the inner flow passage, and an inner wall of said second annual groove is inclined toward the inner flow passage.

14. The nozzle as claimed in claim 10, wherein an outer wall of said second annular groove is located radially outwardly relative to an outer wall of said first annular groove.

15. The nozzle as claimed in claim 10, wherein said first and second grooves have bottoms that are located at substantially the same level with respect to the axis of the inner flow passage.

* * * * *